United States Patent [19]

Albach

[11] Patent Number: 4,761,171

[45] Date of Patent: Aug. 2, 1988

[54] APPARATUS FOR COATING GLASS

[75] Inventor: Eberhard R. Albach, Toledo, Ohio

[73] Assignee: Libbey-Owens-Ford Co., Toledo, Ohio

[21] Appl. No.: 12,276

[22] Filed: Feb. 9, 1987

[51] Int. Cl.$^4$ ............................................. C03C 17/00
[52] U.S. Cl. ...................................... 65/146; 65/60.5; 65/157; 65/161; 65/181; 118/600; 118/715; 118/719
[58] Field of Search ................. 65/60.5, 356, 157, 146, 65/161, 181, 182.1; 118/600, 715, 719

[56] References Cited

U.S. PATENT DOCUMENTS 4,088,471 5/1978 Kirkbride et al. ............... 65/356 X
4,240,816 12/1980 McMaster et al. ................ 65/60.5

*Primary Examiner*—Arthur Kellogg
*Attorney, Agent, or Firm*—Marshall & Melhorn

[57] ABSTRACT

A gas distributor beam includes a plenum and distribution slot surrounded by a generally V-shaped cooling fluid chamber. The circulation of a suitable cooling fluid tends to maintain the plenum and distribution slot at a temperature below four hundred degrees Fahrenheit for the distribution of diborane gas to an upper surface of a heated glass ribbon. Carbon blocks are utilized to stabilize the glass temperature above nine hundred fifty degrees Fahrenheit for the proper deposition of boron on the surface of the glass. Insulation between the carbon blocks and the outer walls of the cooling fluid chamber minimize heat transfer and the shape of the cooling chamber minimizes the exposure of the glass to the lower temperatures of the cooling chamber.

18 Claims, 2 Drawing Sheets

APPARATUS FOR COATING GLASS

BACKGROUND OF THE INVENTION

This invention relates to the coating of glass and, in particular, to an apparatus for coating glass with boron as a protective coating over another coating material.

A variety of coating materials have been used or have been proposed for modifying the radiation transmission and reflection characteristics of glass, for enhancing the appearance of glass, or for providing decorative patterns on a glass surface. Such coatings often serve more than one purpose. For example, metal oxide coatings and vacuum-evaporated metal coatings have been used to endow glass with solar control properties while at the same time giving the glass an attractive hue. However, many coating materials having desired properties are sensitive to chemical and/or mechanical damage encountered during use and a protective coating is required.

For example, boron has been found to be a good protective coating for titanium nitride used as a coating material on glass. Boron deposits are very hard and can not be penetrated by abrasive cleaners. Also, chemical resistance to acids and alkalis is outstanding. Boron is easily deposited from diborane, its simplist hydride, but the decomposition of diborane is exceedingly rapid and is temperature sensitive. Thus, previously known vapor deposition beams, such as the apparatus disclosed in U.S. Pat. No. 4,088,471, can not be successfully utilized to deposit boron.

SUMMARY OF THE INVENTION

The present invention concerns a distributor beam for coating the surface of a hot glass ribbon with boron. A generally circular cross-section plenum is utilized to direct diborane at the hot glass surface. The plenum is surrounded by a generally triangularly shaped chamber for cooling fluid to maintain the plenum at no more than 400° F. The cooling chamber is insulated from surrounding carbon blocks which permit the maintenance of glass temperatures greater than 950° F. which are required for boron to deposit as a hard layer through pyrolysis.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
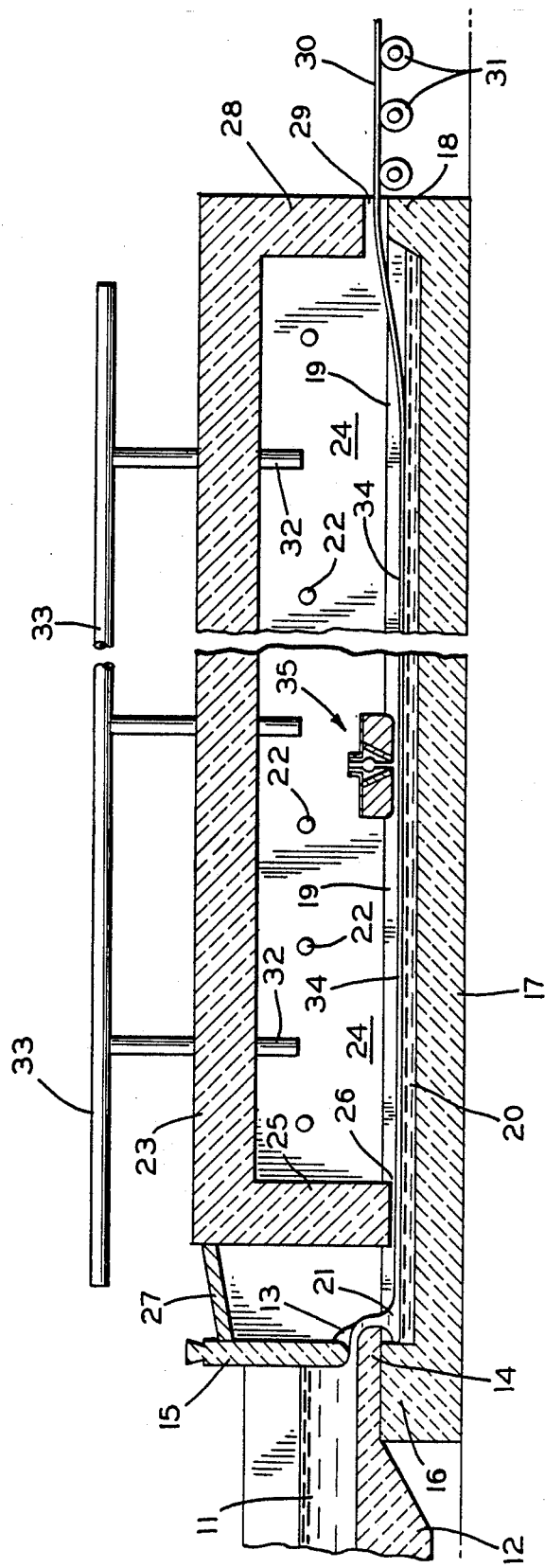
FIG. 1 is a vertical section through a float manufacturing apparatus showing a gas distributor according to the present invention.

There is shown in FIG. 1 a float glass manufacturing apparatus in which molten glass 11 is being delivered in a conventional manner along a canal 12 leading from the forehearth of a glass melting furnace (not shown). The canal 12 terminates in a spout having side jambs 13 and a lip 14. The flow of molten glass to the spout, usually soda-lime-silica glass, is controlled by a regulating tweel 15. The spout extends over an inlet end wall 16 of a tank structure comprising a floor 17, an outlet end wall 18 and side walls 19. The tank structure contains a bath of molten metal 20, usually molten tin or tin alloy in which tin predominates, and molten glass flows as indicated at 21 over the spout lip 14 onto the surface of the molten metal bath 20 at the inlet end of the bath. The temperature at the inlet end is maintained in the region of one thousand degrees centigrade by heaters, indicated at 22, mounted in a roof structure 23 which is supported over the tank structure and defines a head space 24 above the molten metal bath. The roof structure has an inlet end wall 25 which depends downwardly close to the surface of the molten metal bath 20 at the inlet end of the bath to provide an inlet 26 of restricted height. An extension 27 of the roof structure extends up to the tweel 15 to provide a chamber in which the spout is enclosed.

The roof structure 23 also has a downwardly depending wall 28 at an outlet end defining an outlet opening 29. A ribbon of glass 30 produced on the bath exits from the outlet 29 between the lower face of the outlet end wall 28 of the roof structure and the upper face of the outlet end wall 18 of the bath. Driven traction rollers 31 are mounted beyond the outlet 29 with the upper surface of the rollers just above the level of the upper surface of the bath end wall 18 so that the ribbon of glass 30 is lifted gently from the bath surface for discharge horizontally away from the outlet 29 on the rollers 31.

A protective atmosphere, for example 95% nitrogen and 5% hydrogen, is maintained at a plenum in the head space 24 over the bath, being supplied through ducts 32 connected to a common header 33 and extending downwardly through the roof 23. The protective atmosphere flows outwardly through the inlet 26 to fill the chamber enclosing the spout. A temperature gradient is maintained down the bath from the temperature of about one thousand degrees centigrade at the inlet end of the bath to a temperature in the range of about five hundred seventy degrees centigrade to six hundred fifty degrees centigrade at the outlet end where the ribbon of glass is discharged from the bath. At this lower temperature at the outlet end, the glass is sufficiently stiffened to be unharmed by its contact with the traction rollers 31 but can still be lifted from the bath surface as illustrated.

The molten glass 11 which flows over the spout lip 14 onto the bath is permitted to flow laterally on the bath to form a layer 34 of molten glass which is cooled and discharged from the bath. The width of the tank structure containing the bath between the side walls 19 is greater than the width of the ribbon 30.

A gas distributor 35 for supplying diborane to the surface of the glass layer 34 is located transversely of the path of travel of the glass along the bath toward the inlet end of the bath in an area where the temperature of the glass is in the range of approximately twelve hundred degrees Fahrenheit. The gas distributor 35 is shown in more detail in FIG. 2.

Figure 2:
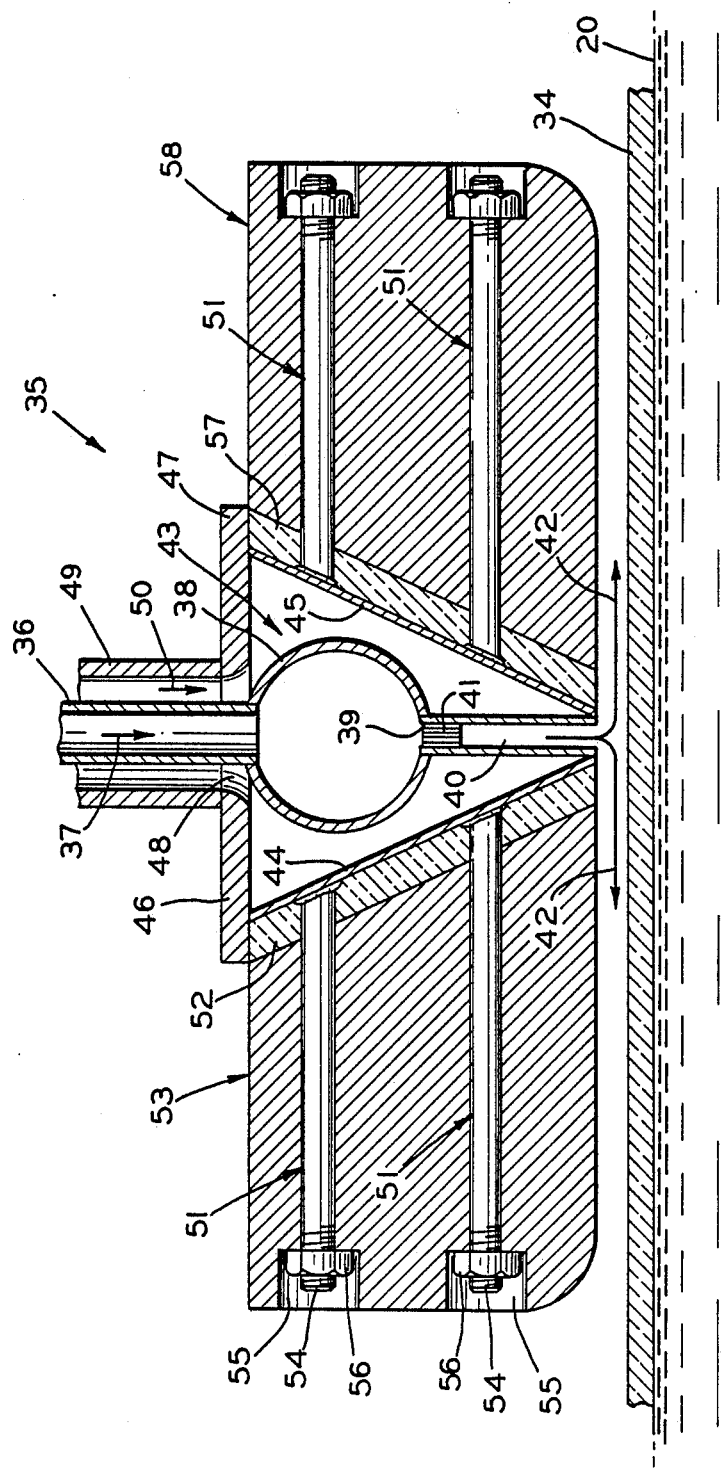
FIG. 2 is an enlarged cross-sectional view of the gas distributor of FIG. 1.

The gas distributor beam 35 is shown in cross-section in FIG. 2. The configuration shown is typical for the gas distributor across the full width of the layer of molten glass 34. Although not shown, the ends of the gas distributor 35 are supported by conventional means. A gas supply duct 36 is connected to a source of gas (not shown) which can be, for example, a mixture of diborane and nitrogen. The gas flows in the gas supply duct 36 as indicated by an arrow 37 and enters an elongated plenum 38 which is connected to the gas supply duct 36.

The plenum 38 has a generally circular cross-section and extends the full length of the gas distributor beam 35. The plenum 38 has an elongate slot-shaped aperture 39 formed in the lower wall thereof which aperture is connected to an elongated distribution slot or duct 40 which terminates in an opening above an upper surface of the layer of molten glass 34. A gas flow restrictor means 41 is positioned at the upper end of the distribution slot 40 adjacent the elongate aperture 39.

The restrictor means 41 can be a well known "waffle pack" made up of crimped metal sheets arranged "out of phase" to define a plurality of channels which are of small cross-sectional area relative to the cross-sectional area of the gas supply duct 36 and plenum 38. Thus, when the gas is supplied under pressure to the duct 36, the pressure drop along the duct is small compared to the pressure drop through the restrictor means 41 to insure release of the gas as indicated by the arrows 42 at a substantially constant pressure and temperature along the whole length of the distribution slot 40. The gas supply duct 36 could be formed as a pair of pipes, one connected at either end of the plenum 38, or as a plurality of pipes connected at spaced intervals along the plenum 38.

The plenum 38 and the distribution slot 40 are enclosed within a generally V-shaped cooling fluid chamber 43. A pair of side walls 44 and 45 have their lower ends attached to the lower ends of the associated walls of the distribution slot 40 thereby closing the bottom of the chamber 43. The upper end of the side wall 44 is attached to a generally horizontally extending flange 46 and the upper end of the side wall 45 is attached to a generally horizontally extending flange 47 to enclose the upper end of the chamber 43. The flanges 46 and 47 can be, for example, opposite edges of a flat sheet having an aperture 48 formed therein. The aperture 48 is in fluid communication with the lower end of a cooling fluid supply tube 49. The supply tube 49 can be positioned coaxially with the gas supply duct 36 and have its lower end attached to an upper surface of the sheet forming the flanges 46 and 47. Cooling fluid flows down the supply tube 49 as shown by an arrow 50 from a source (not shown). A return tube for the heated cooling fluid can be attached in a similar manner at any suitable location along the cooling fluid chamber 43.

One end of each of a plurality of generally horizontally extending bolts or studs 51 is attached to an outer surface of each of the side walls 44 and 45. The studs 51 extend through an insulation board 52 which abuts an outer surface of the side wall 44. The studs 51 also extend through a carbon block 53 which is positioned adjacent an outer surface of the insulation board 52. Opposite the ends attached to the side wall 44 are threaded ends 54 of the studs 51 which extend into associated recesses 55 formed in an outer vertically extending wall of the carbon block 53. A plurality of nuts 56 are provided, each engaging associated one of the threaded ends 54 thereby retaining the carbon block 53 adjacent the the insulation board 52. Such a means for attachment provides for ease of replacement of both the carbon block 53 and the insulation board 52. An insulation board 57 and a carbon block 58 are attached to the outer surface of the side wall 45 in a similar manner.

It is desirable that the diborane in the gas mixture represented by the arrow 37 be maintained at or below approximately four hundred degrees Fahrenheit as it passes through the plenum 38 and the distribution slot 40. Thus, suitable cooling fluid represented by the arrow 50 is provided in the cooling fluid chamber 43 which completely surrounds the plenum 38 and the distribution slot 40. The cross-sectional V-shape of the cooling fluid chamber 43 minimizes the surface area of the chamber adjacent the upper surface of the layer of molten glass 34 thereby minimizing the cooling effect of the cooling fluid upon both the molten glass and the discharged gas represented by the arrows 42. The carbon blocks 53 and 58 assist in maintaining the glass temperatures greater than nine hundred fifty degrees Fahrenheit. The insulation boards 52 and 57 isolate the lower temperature cooling fluid chamber 43 from the higher temperature carbon blocks 53 and 58 thereby minimizing heat transfer and assisting in temperature stabilization in both regions. Such a gas distributor beam construction has been found especially useful in depositing boron over a coating such as titanium nitride on the surface of a layer of molten glass.

In accordance with the provisions of the patent statues, the present invention has been described in what is considered to represent its preferred embodiment. However, it should be noted that the invention can be practiced otherwise than as specifically illustrated and described without departing from its spirit or scope.

What is claimed is:

1. An apparatus for coating glass by depositing a coating material from a gas directed on a heated upper surface of a layer of glass comprising:
    an elongated plenum having an inlet and an outlet for a gas;
    an elongated distribution slot having an inlet opening connected to said outlet of said plenum and having an outlet opening adapted to be spaced above an upper surface of a layer of glass to be coated; and
    a cooling fluid chamber enclosing said plenum and said distribution slot and having a generally V-shaped cross-section tapering toward said distribution slot outlet opening.

2. The apparatus according to claim 1 wherein said plenum is generally circular in cross-section.

3. The apparatus according to claim 1 including restrictor means connected between said outlet of said plenum and said inlet opening of said distribution slot.

4. The apparatus according to claim 3 wherein said restrictor means is a waffle pack.

5. The apparatus according to claim 1 including carbon blocks attached to opposite sides of said cooling fluid chamber.

6. The apparatus according to claim 5 including a plurality of studs each having one end connected to an outer surface of a side wall of said cooling fluid chamber and extending in a generally horizontal direction through said carbon blocks.

7. The apparatus according to claim 6 wherein each of said studs has an opposite threaded end extending into a recess formed in a wall of an associated one of said carbon blocks and threadably engaging a nut for releasably attaching said associated carbon block to said side wall.

8. The apparatus according to claim 5 including insulating means positioned between said carbon blocks and said opposite sides of said cooling fluid chamber.

9. The apparatus according to claim 1 including a supply tube in fluid communication with the interior of said cooling fluid chamber and a gas supply duct connected to said inlet of said plenum and enclosed by said supply tube.

10. An apparatus for coating an upper surface of a sheet of heated glass with a coating material comprising:
   an elongated plenum having an inlet and an outlet for a gas containing a coating material, said outlet formed as an elongated aperture in a wall of said plenum;
   an elongated distribution duct formed with an elongated inlet opening connected to said elongated aperture outlet in said plenum and an elongated outlet opening adapted to be spaced above an upper surface of a sheet of heated glass; and
   an elongated cooling fluid chamber enclosing said plenum and said distribution duct and having a pair of opposed side walls spaced closer together at their bottom edges than at their top edges to define a generally V-shaped cross-section for said chamber, said plenum inlet and said distribution duct outlet opening being in communication with the exterior of said chamber.

11. The apparatus according to claim 10 wherein insulating means are attached to an outer surface of each of said opposed side walls and a carbon block is attached in abutting relationship to said insulating means.

12. The apparatus according to claim 11 including a plurality of studs each having one end attached to an outer surface of one of said opposed side walls and an opposite threaded end extending through said insulating means and said carbon block into threaded engagement with a nut for releasably retaining said carbon block and said insulating means attached to said side wall.

13. The apparatus according to claim 10 including a gas supply duct connected to said plenum inlet and a cooling fluid supply tube connected to said chamber.

14. The apparatus according to claim 13 wherein said gas supply duct is tubular and is coaxial with said cooling fluid supply tube.

15. An apparatus for coating an upper surface of a sheet of heated glass with a coating material in a gas comprising:
   an elongated plenum having a generally circular cross-section, an inlet opening, and an outlet formed as an elongated aperture in a wall of said plenum;
   an elongated distribution duct having an elongated inlet opening connected to said elongated aperture in said plenum and an elongated outlet opening;
   an elongated cooling chamber enclosing said plenum and said distribution duct and having a pair of opposed side walls connected along bottom edges to bottom edges of walls of said distribution duct defining said outlet opening, said side walls being spaced apart along top edges thereof to define a generally V-shaped cross-section for said chamber;
   insulation board attached along outer surfaces of said side walls; and
   a pair of elongated carbon blocks abutting said insulation board and extending along said opposed side walls.

16. The apparatus according to claim 15 including a plurality of studs each extending through an associated one of said carbon blocks and through an associated insulation board and having one end attached to an associated one of said side walls and an opposite end threadably engaged with an associated nut to releasably attach said insulation boards and said carbon blocks to said side walls.

17. The apparatus according to claim 16 wherein said plenum inlet opening is connected to a gas supply duct, said chamber is connected to one end of a cooling fluid supply tube, and a restrictor means is connected between said elongated aperture in said plenum and said distribution duct inlet opening.

18. The apparatus according to claim 17 wherein said cooling fluid supply tube encloses and is coaxial with said gas supply duct.

* * * * *